P. HEDSTROM.
AUTOTRUCK DUMP.
APPLICATION FILED FEB. 10, 1919.
1,302,797.
Patented May 6, 1919.
3 SHEETS—SHEET 2.
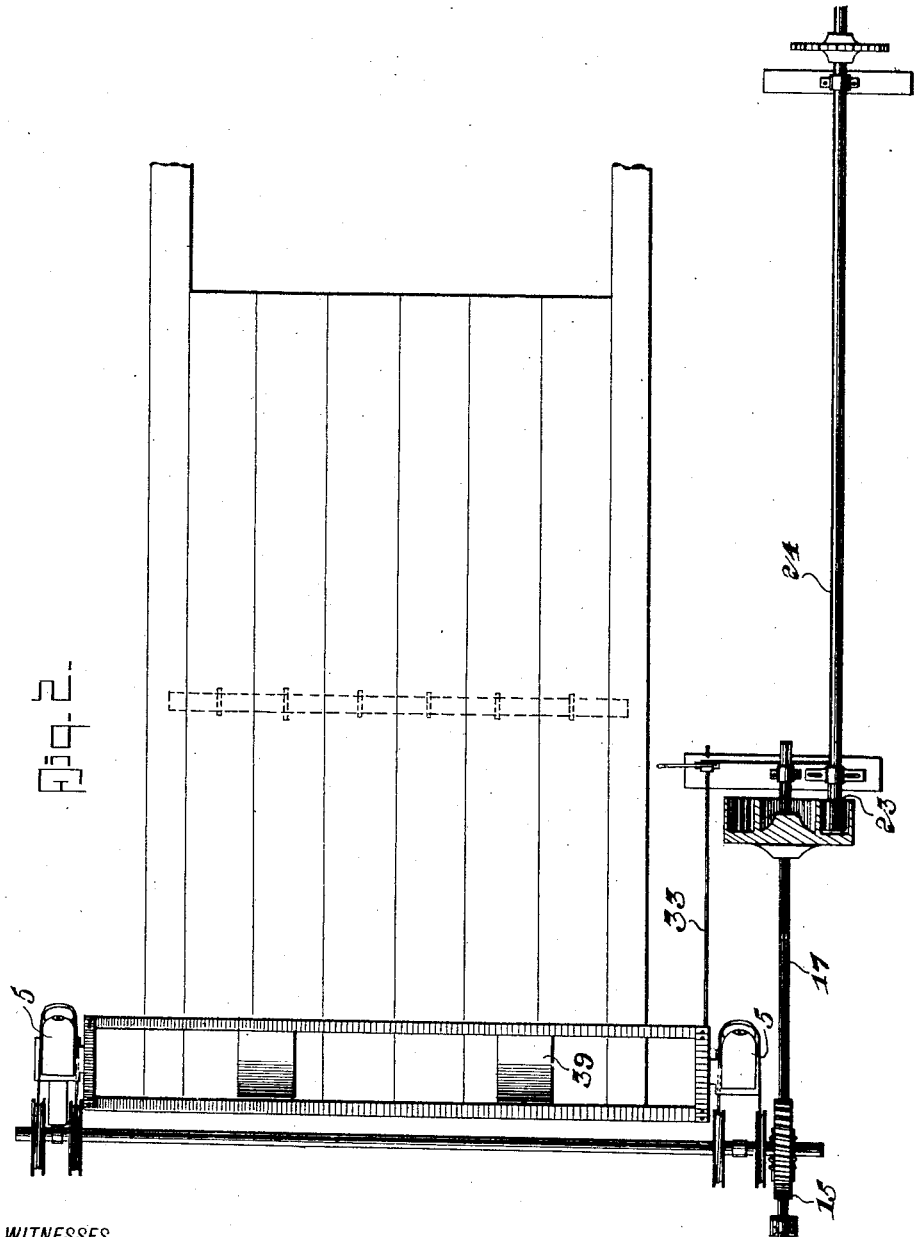
WITNESSES
INVENTOR
Peter Hedstrom
BY
ATTORNEYS

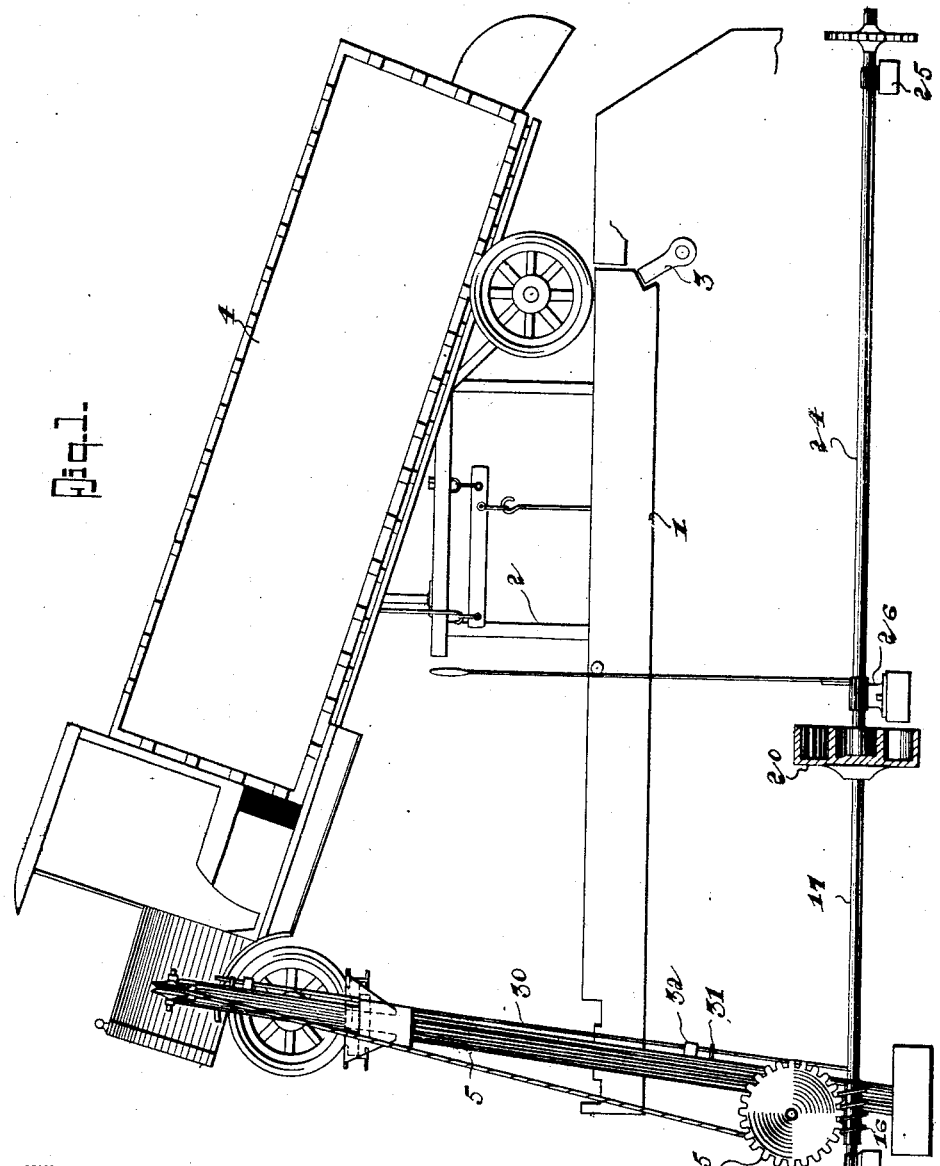

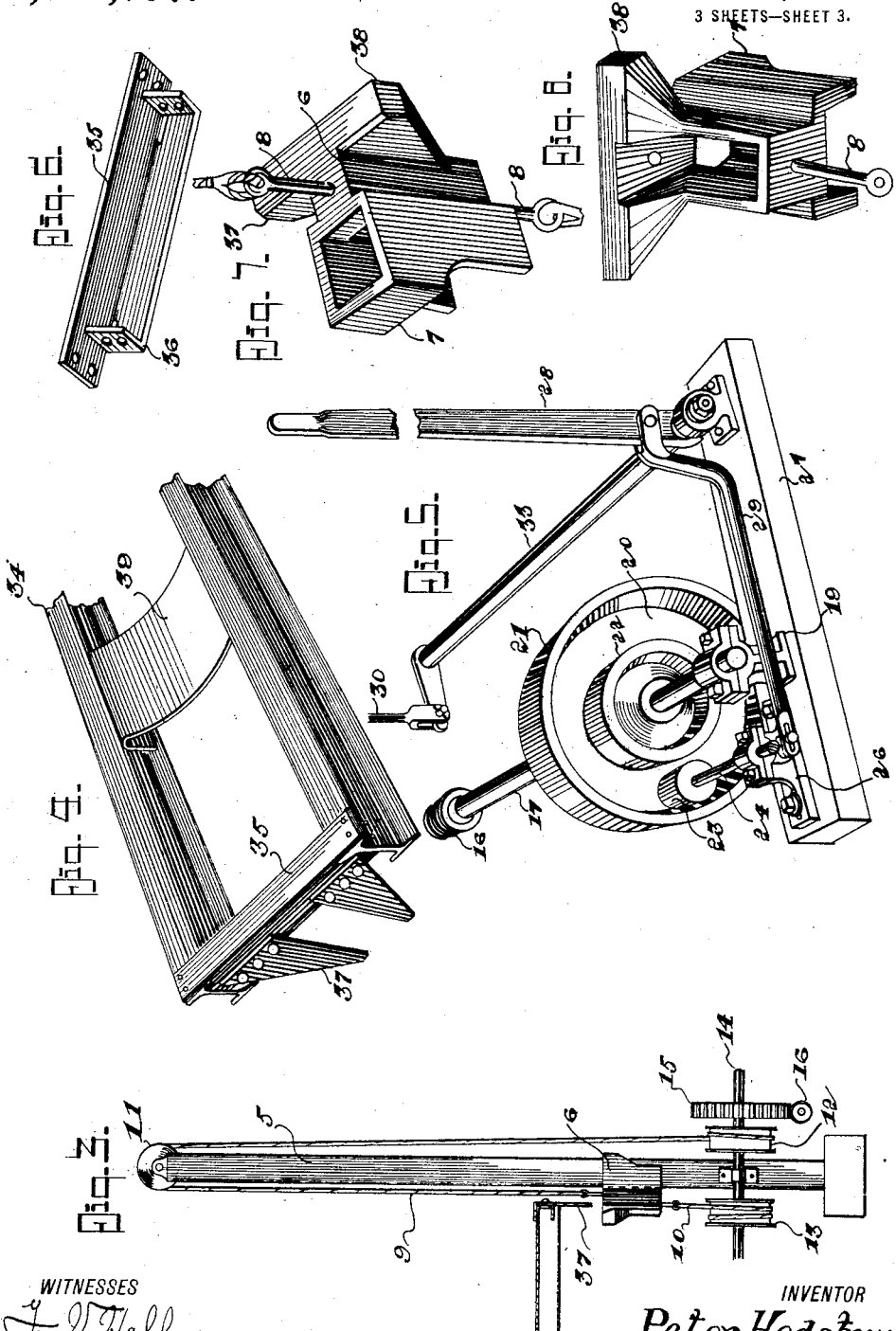

UNITED STATES PATENT OFFICE.

PETER HEDSTROM, OF MINNEAPOLIS, MINNESOTA.

AUTOTRUCK-DUMP.

1,302,797.  Specification of Letters Patent.  Patented May 6, 1919.

Application filed February 10, 1919. Serial No. 276,188.

*To all whom it may concern:*

Be it known that I, PETER HEDSTROM, a citizen of the United States, and a resident of Minneapolis, in the county of Hennepin and State of Minnesota, have made certain new and useful Improvements in Autotruck-Dumps, of which the following is a specification.

My invention is an improvement in auto truck dumps and has for its object to provide a device of the character specified for use in connection with dump weighing scales for lifting the front end of a motor truck, to dump the load through the rear end, and so arranged that the lifting mechanism will not interfere with the proper weighing of the load.

In the drawings:—

Figure 1 is a side view of the dump with parts in section;

Fig. 2 is a top plan view with parts in section;

Fig. 3 is a side view of the hoisting mechanism;

Fig. 4 is a perspective view of the rear end of one of the supports for the wheels;

Fig. 5 is a perspective view of the controlling mechanism for the wheels;

Fig. 6 is a perspective view of the angle plate connection of the cradle;

Fig. 7 is a perspective view of one of the slides;

Fig. 8 is a similar view of the same looking in another direction.

In the present embodiment of the invention, the dump 1, which is of usual construction, is the platform of the scale indicated at 2. The dump is normally held from tilting or dumping by pawls 3, which engage the rear end, as indicated in Fig. 1. The improvement is designed to operate independent of the dump, that is, to lift the front wheels of the truck indicated at 4, while the truck is supported by the dump with the dump in horizontal position, and lift the said wheels to discharge the load out of the truck.

With this purpose in view, a pair of uprights or standards 5 is provided, arranged at opposite sides of the front end of the dump and upon each of these standards is mounted to slide a shoe 6. Each of these shoes has a sleeve or bearing 7 for engaging the standards, and eyes 8 are connected with the top and bottom of the shoe. To these eyes are secured cables 9 and 10, the cable 9 passing upwardly over a pulley 11 at the top of the standard and downwardly to wind upon the reel 12 while the cable 10 winds directly on the wheel 13 arranged on the opposite side of the standard from the reel 12. These reels are secured on a shaft 14, which is journaled in bearings on the standards and is provided at one end with a worm wheel 15, which meshes with a worm 16 upon a shaft 17 journaled in fixed bearings 18 and 19 longitudinally of the dump.

The end of the shaft remote from the worm 16 carries a friction disk 20, which has two concentric lateral ribs or flanges 21 and 22, extending from that face remote from the worm. A friction roll 23 is secured on a transmission shaft 24 which is journaled in bearings 25 and 26. One of these bearings or pillow-blocks 26 is mounted to slide on a beam 27, and it is moved by means of a lever 28 which is pivoted to the beam and is connected to the bearing by a link 29.

It will be obvious that by swinging the lever in the proper direction, the bearing may be moved to cause the roller 23 to engage with either flange 21 or 22, the said roller being normally between the flanges.

When engaged with the flange 21, the relative speed of the shaft 17 with respect to the shaft 24 will be low, while when the roller is engaged with the flange 22 the relative speed of the shaft 17 will be high and in the opposite direction. Means is also provided for operating the lever 20 to release the roller 23 from both the flanges when the shoes 6 are at the end of their travel in either direction. This mechanism is a rod 30 which is mounted to slide in guides 32 on one standard 5, and is provided with stops 31 near its ends for engagement by the shoes when they are at the end of their travel in each direction. The lower end of the rod is connected to a radial arm on a shaft 33 arranged parallel with the shaft 17, and to which the lever 28 is secured.

A rest or cradle is provided for the front wheels of the truck, the said rest or cradle being supported by the dump but detached therefrom and adapted for engagement by the shoes 6 to lift the said cradle to dump the load. This rest or cradle is composed of a pair of spaced parallel I beams 34 connected at their ends by the angle plates 35 shown in Fig. 6. These plates have a horizontal portion which laps upon the upper face of the I beam and a vertical portion which extends between the webs of the I beams and at each end this vertical portion has an angular lug 36 which is riveted to the web of the adjacent I beam.

Plates 37 of approximately triangular form are riveted to the vertical portion, the upper ends of the plates extending through slots in the angle plate at the junction of the two portions, and these plates are adapted to engage opposite sides of the shoe behind oppositely extending wings 38 at the rear of the shoe.

The cradle has near each end, a web 39, extending between the I beams, and each web is curved downwardly, as shown. These webs are adapted to receive the front wheels and to support the same during the lifting of the truck. The cradle is independent of the dump and also independent of the shoes, being entirely detached from the shoes when it is supported upon the dump, and being entirely detached from the dump when it is supported by the shoes.

In operation, the truck to be dumped is driven upon the scale dump, and after being weighed in the usual manner, the roll 23 is shifted to engage the web 21, which is the low speed connection for lifting the loaded truck. Normally, the shoes occupy the position shown in Fig. 3, that is, well below the plates 37. As soon as the reels 12 begin to wind up the cables 9, the shoes will lift and the plates 37 will engage behind the wings 38. Further movement of the shoes will lift the cradle, and will lift the front wheels and front end of the truck, so that the contents thereof may slide up through the rear end. As soon as the cradle engages the uppermost stop on the rod 30, the roller 23 will be shifted into neutral position by the movement of the pillow block 26. Now by operating the lever 28 the roller 23 may be engaged with the flange 22, which has the high speed connection for lowering the truck. As soon as the cradle nears the end of its downward movement it will engage the lowermost stop of the rod 30 and will again release the transmission.

I claim:—

1. In combination with a weighing scale, of a cradle at one end of the scale adapted to receive the front wheels of a motor vehicle, said cradle normally resting upon the scale platform, a standard at each end of the cradle, a shoe mounted to slide on each standard and adapted to engage the adjacent end of the cradle when it is moved upward, means for simultaneously moving the shoes in either direction on the standard, a transmission shaft, and a connection between the said shaft and the shoe moving means for controlling the same in opposite directions, and at different speeds.

2. In combination with a weighing scale, of a cradle at one end of the scale adapted to receive the front wheels of a motor vehicle, said cradle normally resting upon the scale platform, a standard at each end of the cradle, a shoe mounted to slide on each standard and adapted to engage the adjacent end of the cradle when it is moved upward, means for simultaneously moving the shoes in either direction on the standard, a transmission shaft, and a connection between the said shaft and the shoe moving means for controlling the same in opposite directions.

3. In combination with a weighing scale, of a cradle at one end of the scale adapted to receive the front wheels of a motor vehicle, said cradle normally resting upon the scale platform, a standard at each end of the cradle, a shoe mounted to slide on each standard and adapted to engage the adjacent end of the cradle when it is moved upward, means for simultaneously moving the shoes in either direction on the standard.

4. In combination with a platform of a weighing scale, of a cradle at one end thereof and normally resting upon the platform for receiving the front wheels of the truck, a standard at each end of the cradle, a shoe mounted to slide on each standard, said shoes and cradles having interengaging means for locking the cradle to the shoes when the shoe is moved upwardly beneath the cradle, a pulley at the top of each standard, a shaft journaled upon the standards transversely thereof and carrying at each end a reel, a flexible connection connected with each end of each shoe and winding upon the reels, one of the connections passing over the pulley, means for rotating the shaft in opposite directions, and means controlled by the shoes near the end of their movement in each direction for releasing the moving means from the shoe.

5. In combination with a platform of a weighing scale, of a cradle at one end thereof and normally resting upon the platform for receiving the front wheels of the truck, a standard at each end of the cradle, a shoe mounted to slide on each standard, said shoes and cradles having interengaging means for locking the cradle to the shoes when the shoe is moved upwardly beneath the cradle, a pulley at the top of each standard, a shaft journaled upon the standards transversely thereof and carrying at each end a reel, a flexible connection connected with each end of each shoe and winding upon the reels, one of the connections passing over the pulley, and means for rotating the shaft in opposite directions.

6. In combination with a platform of a weighing scale, of a cradle at one end thereof and normally resting upon the platform for receiving the front wheels of the truck, a standard at each end of the cradle, a shoe mounted to slide on each standard, said shoes and cradles having interengaging means for locking the cradle to the shoes when the shoe is moved upwardly beneath the cradle.

PETER HEDSTROM.

Witnesses:
GEORGE GRANT,
JOHN I. BELL.

Copies of this patent may be obtained for five cents each, by addressing the "Commissioner of Patents, Washington, D. C."